United States Patent
Xie et al.

(10) Patent No.: US 8,974,257 B1
(45) Date of Patent: Mar. 10, 2015

(54) ELECTRICAL CONNECTOR

(71) Applicant: Cheng Uei Precision Industry Co., Ltd., New Taipei (TW)

(72) Inventors: Bao-Geng Xie, Dong-Guan (CN); Wei-Hong Liao, Dong-Guan (CN); Yin-Lung Wu, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/055,854

(22) Filed: Oct. 16, 2013

(51) Int. Cl.
*H01R 4/48* (2006.01)
*H01R 13/516* (2006.01)

(52) U.S. Cl.
CPC .................... *H01R 13/516* (2013.01)
USPC ........................................................ 439/862

(58) Field of Classification Search
CPC ........................... H01R 13/2442; H01R 12/57
USPC ............................................ 439/862, 83, 66
See application file for complete search history.

(56) References Cited

U.S. PATENT DOCUMENTS

| | | | |
|---|---|---|---|
| 7,220,152 B2 * | 5/2007 | Jeong ............................. | 439/862 |
| 8,052,428 B2 * | 11/2011 | Tsao ................................ | 439/66 |
| 8,206,188 B1 * | 6/2012 | Zhang et al. ................... | 439/862 |
| 8,517,779 B2 * | 8/2013 | Zhang et al. ................... | 439/862 |
| 8,657,636 B2 * | 2/2014 | Wu .................................. | 439/862 |
| 2006/0276085 A1 * | 12/2006 | Ma et al. ........................ | 439/862 |
| 2007/0224890 A1 * | 9/2007 | Chien et al. ................... | 439/862 |

* cited by examiner

*Primary Examiner* — Phuongchi T Nguyen
(74) *Attorney, Agent, or Firm* — Cheng-Ju Chiang

(57) ABSTRACT

An electrical connector includes an insulating housing and a plurality of electrical terminals. A top face of the insulating housing is concaved downward to define a plurality of terminal grooves alternately arranged into two rows along two longitudinal sides of the insulating housing. Each terminal groove extends transversely to have the outer end thereof penetrate through a corresponding side face of the insulating housing. The inner ends of the two rows of terminal grooves are alternate with one another along a substantial longitudinal middle of the insulating housing. The electrical terminals are firstly assembled downward and then pushed transversely inward to be assembled in the terminal grooves respectively.

4 Claims, 6 Drawing Sheets

ELECTRICAL CONNECTOR

BACKGROUND OF THE INVENTION

1. Field of the Invention

The present invention relates to an electrical connector, and more particularly to an electrical connector capable of meeting the requirements of miniaturization of electronic products.

2. The Related Art

At present, electrical connectors are widely used in electronic products to realize data transmission between the electronic products and corresponding peripheral equipments. Referring to FIG. 1, a conventional electrical connector is shown. The electrical connector includes an insulating housing 10' and a plurality of electrical terminals 30'. The insulating housing 10' defines a plurality of terminal grooves 20' arranged at regular intervals along a transverse direction. Each of the terminal grooves 20' extends longitudinally to penetrate through a rear face of the insulating housing 10'. The electrical terminals 30' are assembled into the terminal grooves 20' levely from back to front.

However, the electrical terminals 30' are arranged in the insulating housing 10' in a single side-by-side setup, so the width of the electrical connector is tied to the number of the electrical terminals 30'. And in order to avoid interference of electric signals among the electrical terminals 30' and poor mechanical strength of the electrical terminals 30', the width of each electrical terminal 30' and the distance between each two adjacent electrical terminals 30' also have a minimum limit. As a result, the electrical connector in FIG. 1 is difficult to meet the requirement of miniaturization of the electronic product.

SUMMARY OF THE INVENTION

An object of the present invention is to provide an electrical connector which includes an insulating housing and a plurality of electrical terminals. A top face of the insulating housing is concaved downward to define a plurality of terminal grooves. The terminal grooves are alternately arranged into two rows along two longitudinal sides of the insulating housing. Each terminal groove extends transversely to have the outer end thereof penetrate through a corresponding side face of the insulating housing. The inner ends of the two rows of terminal grooves are alternate with one another along a substantial longitudinal middle of the insulating housing. Each of the electrical terminals is curved from a long sheet metal. The electrical terminal has a contact portion, a soldering tail and an elastic portion connected between the contact portion and the soldering tail. The electrical terminals are firstly assembled downward to locate the elastic portions in the terminal grooves respectively and then pushed transversely inward until the elastic portions resist against inner end walls of the corresponding terminal grooves. The soldering tails project downward beyond a bottom face of the insulating housing through the terminal grooves and the contact portions elastically project upward over the corresponding terminal grooves.

As described above, the terminal grooves of the insulating housing are alternately arranged into two rows along the two longitudinal sides of the insulating housing, and the inner ends of the two rows of terminal grooves are alternate with one another along the substantial longitudinal middle of the insulating housing to reduce the distance between each two adjacent terminal grooves, so that effectively reduce the width of the electrical connector. Moreover, the inner ends of the two rows of terminal grooves are alternate with one another along the substantial longitudinal middle of the insulating housing, so that further effectively reduces the length of the electrical connector. So the electrical connector in this invention can meet the requirements of miniaturization of electronic products.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
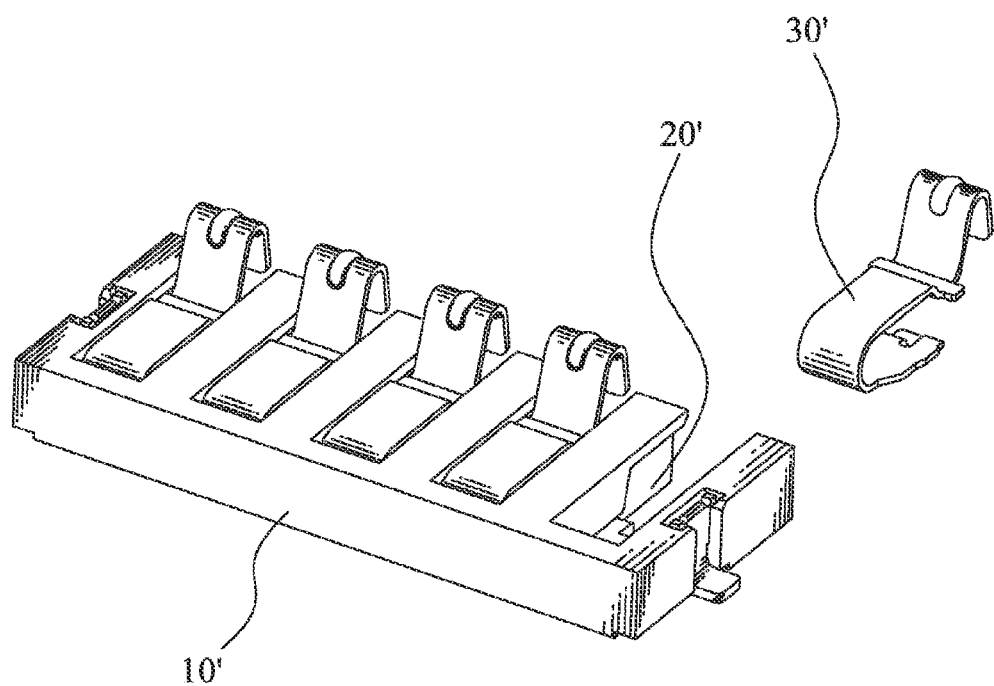
FIG. 1 is a perspective view of a conventional electrical connector.
Figure 2:
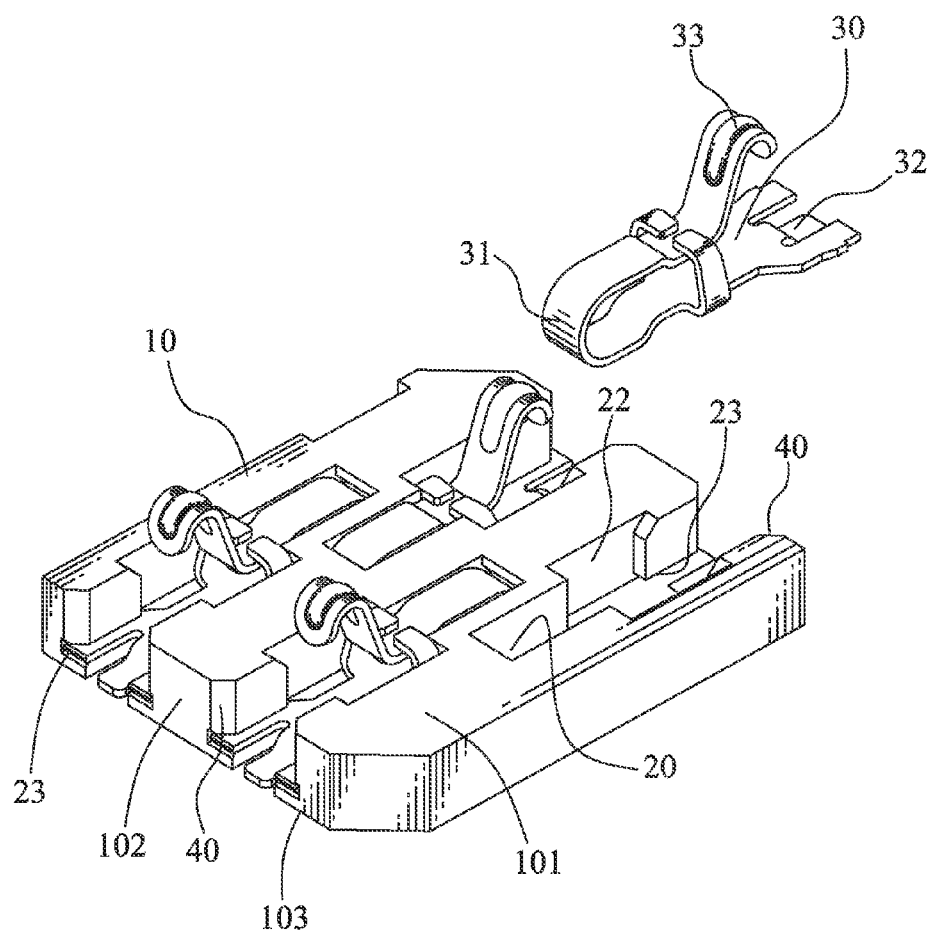
FIG. 2 is a perspective view of an electrical connector in accordance with an embodiment of the present invention.

Referring to FIG. 2, an electrical connector according to an embodiment of the present invention includes an insulating housing 10 and a plurality of electrical terminals 30.

A top face 101 of the insulating housing 10 is concaved downward to define a plurality of terminal grooves 20. The terminal grooves 20 are alternately arranged into two rows along two longitudinal sides of the insulating housing 10. Each terminal groove 20 extends transversely to have the outer end thereof penetrate through a corresponding side face 102 of the insulating housing 10. The inner ends of the two rows of terminal grooves 20 are alternate with one another along a substantial longitudinal middle of the insulating housing 10.

Referring to FIG. 2, FIG. 4, FIG. 5 and FIG. 6, each of the electrical terminals 30 is curved from a long sheet metal. The electrical terminal 30 has a contact portion 33, a soldering tail 32 and an elastic portion 31 connected between the contact portion 33 and the soldering tail 32. The electrical terminals 30 are firstly assembled downward to locate the elastic portions 31 in the terminal grooves 20 respectively and then pushed transversely inward until the elastic portions 31 resist against inner end walls of the corresponding terminal grooves 20. The soldering tails 32 project downward beyond a bottom face 103 of the insulating housing 10 through the terminal grooves 20 and the contact portions 33 elastically project upward over the corresponding terminal grooves 20.

Figure 3:
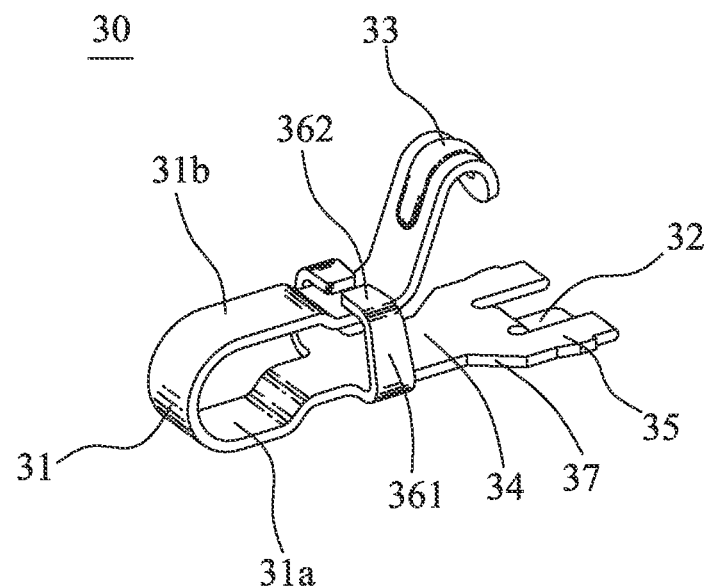
FIG. 3 is a perspective view of an electrical terminal of the electrical connector shown in FIG. 2.
Figure 4:
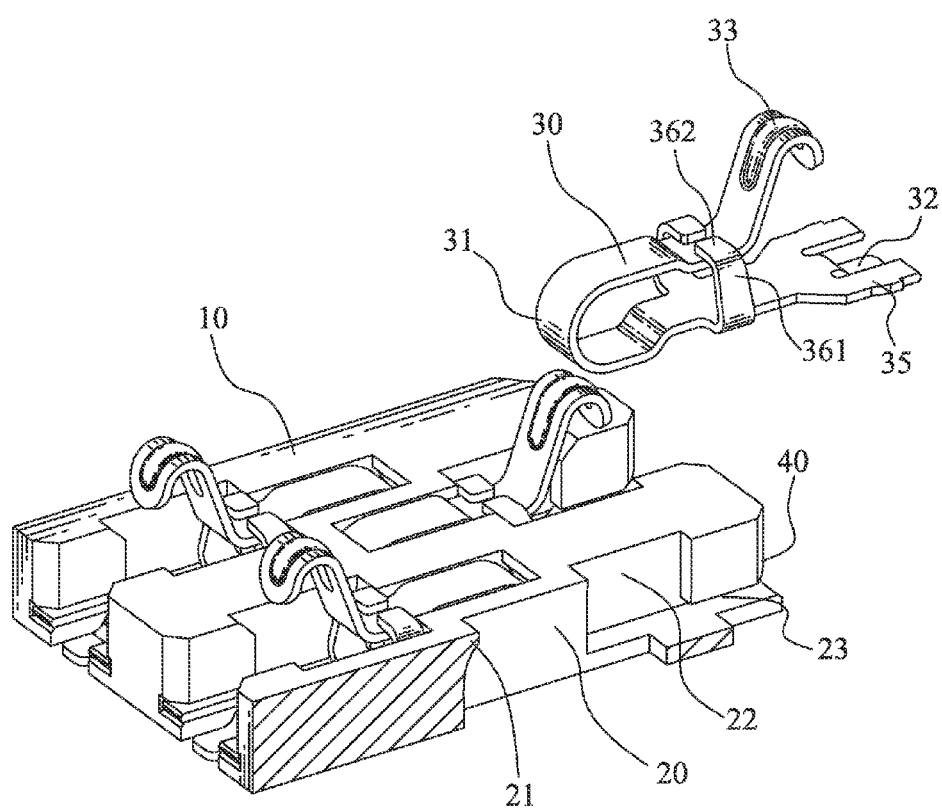
FIG. 4, FIG. 5 and FIG. 6 show how the electrical terminal of FIG. 3 is assembled to an insulating housing of the electrical connector of FIG. 2.
Figure 5:
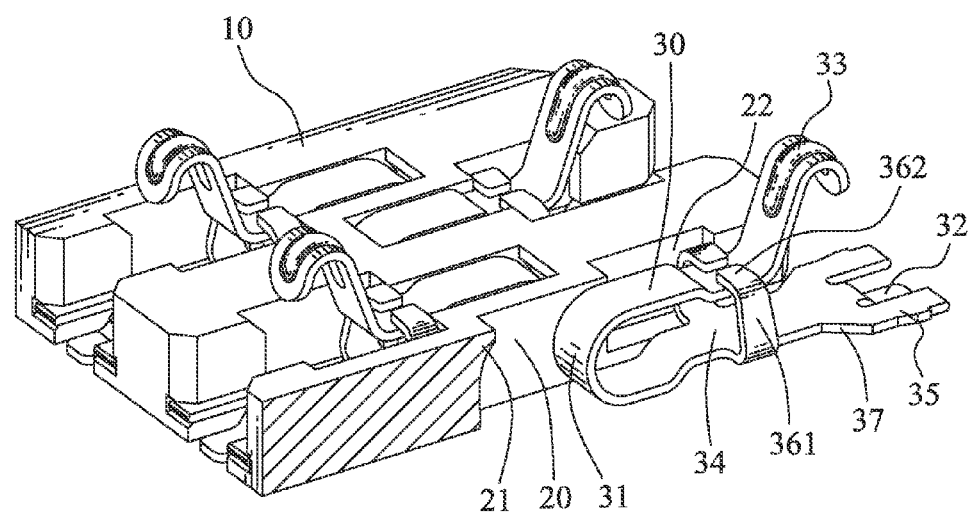
Figure 6:
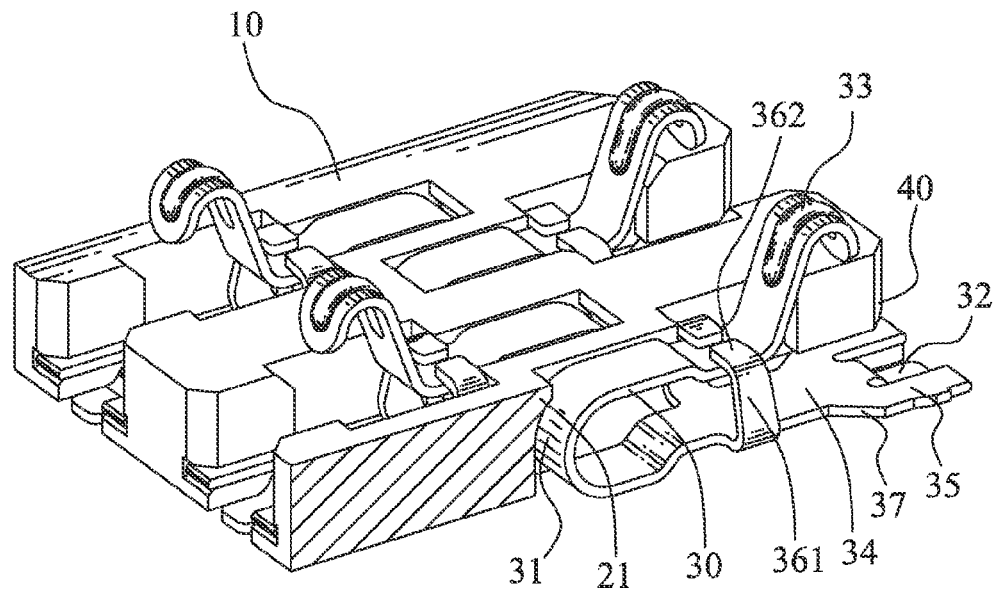

Referring to FIG. 2 and FIG. 3, the elastic portion 31 of the electrical terminal 30 is of lying-U shape. A lower arm 31a of the elastic portion 31 further extends oppositely to the lower arm 31a to form a strengthening portion 34 extending beyond a free end of an upper arm 31b of the elastic portion 31. A middle of a free end of the strengthening portion 34 is bent downward and then extends levely to form the soldering tail 32. The free end of the upper arm 31b of the elastic portion 31 slantwise extends upward and then is bent downward to form the contact portion 33 located over the strengthening portion 34 and the soldering tail 32. The strengthening portion 34 is received in the terminal groove 20 and against a bottom sidewall of the terminal groove 20.

Referring to FIGS. 2-6, a pair of receiving grooves 22 is opened in substantial middles of two face-to-face inner sidewalls of each terminal groove 20 of the insulating housing 10 and penetrates vertically through the top face 101 of the insulating housing 10. Two opposite side edges of the strengthening portion 34 of the electrical terminal 30 extend upward to form a pair of connecting arms 361 located in the receiving grooves 22. Top ends of the connecting arms 361 are bent towards each other to form a pair of stopping portions 362 pressing against a top side of one end of the contact portion 33 connecting with the upper arm 31b of the elastic portion 31 for limiting a rebound height of the contact portion 33. The transverse width of the receiving groove 22 is wider than that of the connecting arm 361 of the electrical terminal 30 for achieving the movement of the connecting arms 361 when the electrical terminal 30 is pushed inward.

Referring to FIG. 3 and FIG. 6 again, an upper part of the inner end wall of the terminal groove 20 of the insulating housing 10 arcuately protrudes to form a restraining portion 21 corresponding to and resisting against the top bend of the elastic portion 31 of the electrical terminal 30 to avoid upwarp of the elastic portion 31 when the contact portion 33 is pressed downward by an external force.

Referring to FIGS. 2-6 again, two sides of the free end of the strengthening portion 34 of the electrical terminal 30 extend oppositely to the strengthening portion 34 and are further broadened outward to form a pair of fastening flanks 35. The two face-to-face inner sidewalls of the terminal groove 20 are concaved oppositely outward to form a pair of fastening slots 23 which extend transversely outward to penetrate through the side face 102 of the insulating housing 10 and are adjacent to the bottom sidewall of the terminal groove 20. The electrical terminal 30 is pushed transversely inward to fasten the fastening flanks 35 in the fastening slots 23.

The end opening of the terminal groove 20 is spread outward to form a splayed entrance 40 extending vertically with a top passing through the top face 101 of the insulating housing 10 and a bottom being adjacent to the bottom sidewall of the terminal groove 20 to communicate with the fastening slots 23. Side edges of the fastening flanks 35 and the strengthening portion 34 of the electrical terminal 30 are connected with a pair of bevel edges 37. The electrical terminal 30 utilizes the cooperation guidance of the bevel edges 37 and the entrance 40 of the terminal groove 20 to be assembled downward so as to make the fastening flanks 35 align with the fastening slots 23 for the convenience of pushing the electrical terminal 30 inward to insert the fastening flanks 35 into the fastening slots 23.

As described above, the terminal grooves 20 of the insulating housing 10 are alternately arranged into two rows along the two longitudinal sides of the insulating housing 10, and the inner ends of the two rows of terminal grooves 20 are alternate with one another along the substantial longitudinal middle of the insulating housing 10 to reduce the distance between each two adjacent terminal grooves 20, so that effectively reduce the width of the electrical connector. Moreover, the inner ends of the two rows of terminal grooves 20 are alternate with one another along the substantial longitudinal middle of the insulating housing 10, so that further effectively reduces the length of the electrical connector. So the electrical connector in this invention can meet the requirements of miniaturization of electronic products.

What is claimed is:

1. An electrical connector, comprising:
   an insulating housing of which a top face is concaved downward to define a plurality of terminal grooves, the terminal grooves being alternately arranged into two rows along two longitudinal sides of the insulating housing, each terminal groove extending transversely to have the outer end thereof penetrate through a corresponding side face of the insulating housing, the inner ends of the two rows of terminal grooves being alternate with one another along a substantial longitudinal middle of the insulating housing; and
   a plurality of electrical terminals of which each is curved from a long sheet metal, the electrical terminal having a contact portion, a soldering tail and an elastic portion connected between the contact portion and the soldering tail, the electrical terminals being firstly assembled downward to locate the elastic portions in the terminal grooves respectively and then pushed transversely inward until the elastic portions resist against inner end walls of the corresponding terminal grooves, the soldering tails projecting downward beyond a bottom face of the insulating housing through the terminal grooves and the contact portions elastically projecting upward over the corresponding terminal grooves;
   wherein the elastic portion of the electrical terminal is of lying-U shape, a lower arm of the elastic portion further extends oppositely to the lower arm to form a strengthening portion extending beyond a free end of an upper arm of the elastic portion, a middle of a free end of the strengthening portion is bent downward and then extends levelly to form the soldering tail, the free end of the upper arm of the elastic portion slantwise extends upward and then is bent downward to form the contact portion located over the strengthening portion and the soldering tail, the strengthening portion is received in the terminal groove and against a bottom sidewall of the terminal groove;
   wherein two sides of the free end of the strengthening portion of the electrical terminal extend oppositely to the strengthening portion and are further broadened outward to form a pair of fastening flanks, two face-to-face inner sidewalls of the terminal groove are concaved oppositely outward to form a pair of fastening slots which extend transversely outward to penetrate through the side face of the insulating housing and are adjacent to the bottom sidewall of the terminal groove, the electrical terminal is pushed transversely inward to fasten the fastening flanks in the fastening slots.

2. The electrical connector as claimed in claim 1, wherein a pair of receiving grooves is opened in substantial middles of two face-to-face inner sidewalls of each terminal groove of the insulating housing and penetrates vertically through the top face of the insulating housing, two opposite side edges of the strengthening portion of the electrical terminal extend upward to form a pair of connecting arms located in the receiving grooves, top ends of the connecting arms are bent towards each other to form a pair of stopping portions pressing against a top side of one end of the contact portion connecting with the upper arm of the elastic portion for limiting a rebound height of the contact portion, the transverse width of the receiving groove is wider than that of the connecting arm of the electrical terminal for achieving the movement of the connecting arms when the electrical terminal is pushed inward.

3. The electrical connector as claimed in claim 1, wherein an upper part of the inner end wall of the terminal groove arcuately protrudes to form a restraining portion corresponding to and resisting against the top bend of the elastic portion to avoid upwarp of the elastic portion when the contact portion is pressed downward by an external force.

4. The electrical connector as claimed in claim 1, wherein the end opening of the terminal groove is spread outward to form a splayed entrance extending vertically with a top passing through the top face of the insulating housing and a bottom being adjacent to the bottom sidewall of the terminal groove to communicate with the fastening slots, side edges of the fastening flanks and the strengthening portion of the electrical terminal are connected with a pair of bevel edges, the electrical terminal utilizes the cooperation guidance of the bevel edges and the entrance of the terminal groove to be assembled downward to make the fastening flanks align with the fastening slots.

* * * * *